Nov. 20, 1928.

W. P. MARR 1,692,414

ELECTRIC WIRE CONNECTER

Filed Oct. 13, 1926

Inventor.
William P. Marr.

Patented Nov. 20, 1928.

1,692,414

UNITED STATES PATENT OFFICE.

WILLIAM P. MARR, OF TORONTO, ONTARIO, CANADA.

ELECTRIC-WIRE CONNECTER.

Application filed October 13, 1926. Serial No. 141,382.

The principal objects of the invention are to facilitate the work of connecting together the ends of electric wires, and to provide a connecter which may be easily and quickly handled in securing it to the wires and which will provide a very secure means of fastening and insulating the ends of the wire.

The principal feature of the invention consists in irremovably securing an insulated tube within a tube of insulating material adapted to receive the wire ends, said inner tube having means for securing the wire ends therein.

In the drawings, Figure 1 is a perspective view of my improved connecter shown attached to some wire ends.

Figure 1:
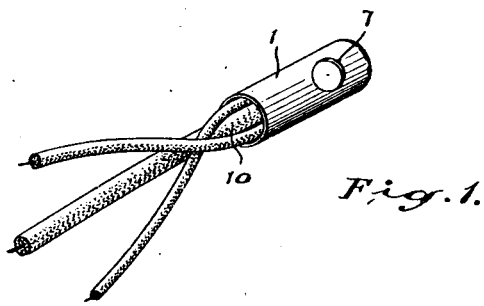
Figure 2:
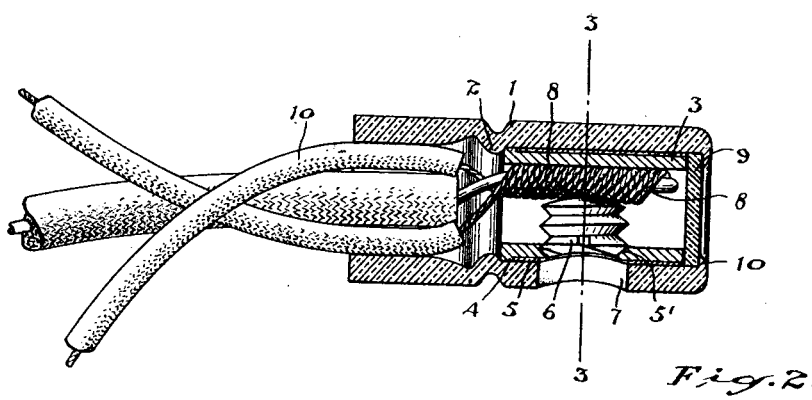
Figure 2 is an enlarged longitudinal sectional view of the connecter.
Figure 3:
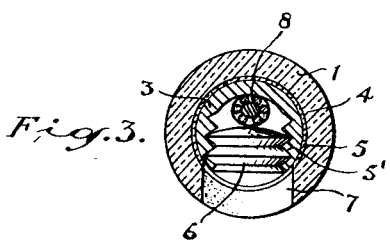
Figure 3 is a transverse sectional view through the line 3—3 of Figure 2.
Figure 4:
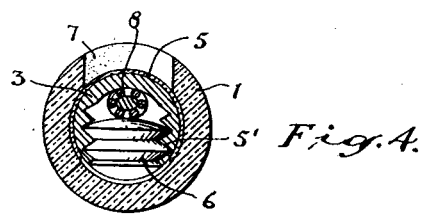
Figure 4 is a view similar to Figure 3 showing the outer insulating cover turned to completely insulate the members enclosed thereby.

The custom of soldering and taping the connected ends of electric wires has been almost completely abandoned and numerous forms of wire connecters have been produced for securely holding the ends together and insulating same. It is the purpose of this invention to simplify and improve the construction of this type of connecter.

In the construction of connecter herein illustrated a tube 1 formed of a length of vulcanized fibre has its wall swaged at a point intermediate of its length to form an annular rib 2 in the inner surface.

A metal tube 3 formed with an outwardly extending flange 4 at one end has placed thereover an insulating cover 5 preferably formed of a thin tube of vulcanized fibre the outer diameter of which is preferably the same diameter as the outer diameter of the flange 4. This composite tube is open at both ends and has a threaded opening 5' in one side thereof, which opening is the full diameter of the interior of the tube and a headless screw 6 is threaded thereinto.

The composite tube is inserted into the tube 1 and the flanged end 4 abuts the rib 2 in the interior thereof and said composite tube is rotatable within the tube 1.

A hole 7 bored in the side wall of the tube 1 is arranged to register with the opening 5' in the composite inner tube to allow of access to the screw so that it can be manipulated to grip the wire ends 8 inserted thereinto.

After the inner tube 3 is inserted in place within the tube 1 a disc 9 of vulcanized fibre is inserted into the end of the tube 1 to abut the end of the inner tube and the edge 10 of the tube 1 is then swaged over the outer side disc, thus permanently securing the disc in place and irremovably retaining the inner tube within the outer tube.

In the use of this connecter, the ends of the wires 8, which are to be connected, are twisted together and then inserted into the open end of the tube 1 so that the insulation of said wires enters the mouth of the tube.

The twisted wire ends 8 extend into the brass tube 3 and the screw 6 is then tightened down upon the wiring, the screw driver being inserted through the hole 7 in the tube 1. When the screw has been tightened securely against the wire ends, the outer tube 1 is then rotated so that the hole 7 is turned out of register with the screw and the insulating cover of the inner tube effectively covers the opening and completely covers all metal parts.

The device is extremely simple. It is cheap to manufacture and very positive in its holding qualities in securing the wires together and it has no loose parts to become disconnected or to require placing in position when the wires are being connected.

What I claim as my invention is:—

1. An electric wire connecter, comprising a tube of insulating material closed at one end, a tube permanently arranged within said insulating tube adapted to receive the ends of the wires to be connected, a fastening member carried by said latter tube for securing the wire ends therein, an opening through the wall of said insulating tube to permit access to said fastening member, and an insulating member interposed between said tubes and adapted to be moved into a position to close the opening in the insulating tube.

2. An electric wire connecter, comprising a tube of insulating material closed at one end, a metal tube movably arranged within the aforesaid tube and confined against removal therefrom and adapted to receive the wire ends to be connected, means carried by said latter tube for securing the wire ends therein, an opening in the wall of said insulating tube, said movable tube being adapted to be moved within the insulating tube to move the securing means carried thereby into or out of registration with said opening, and an insulating member interposed between said tubes and adapted to be moved to a position to close the opening in the insulating tube.

3. An electric wire connecter, comprising a tube of insulating material closed at one end, a metal tube rotatably arranged within the aforesaid tube, means for preventing the removal of said metal tube from the insulating tube, a fastening member threaded in the wall of said metal tube for clamping the wires therein, an opening in the side wall of said insulating tube to register with said fastener member, and an insulating tube encircling said metal tube within the insulating tube and adapted to be rotated within the latter tube to a position to close said opening.

4. An electric wire connecter, comprising a tube of insulating material closed at one end and having an annular rib in its inner wall arranged intermediate of its length, a metal tube rotatably arranged between the closed end and the annular rib of said outer tube and said annular rib engaging the metal tube and confining the same against removal, and means carried by the inner tube for securing the wire ends therein.

5. An electric wire connecter, comprising a tube of insulating material closed at one end and having an annular rib in its inner wall and arranged intermediate of its length and an opening in the side wall between said closed end and the annular rib, an insulated tube rotatably arranged between said rib and the closed end of said tube and having a threaded opening in the side adapted to register with the former opening, and a screw threaded into said opening adapted to fasten the wire ends within the insulated inner tube, said insulated inner tube being adapted to be rotated to move said screw out of register with the opening in said tube of insulating material.

6. An electric wire connecter, comprising a tube of insulating material having an annular rib formed in its inner wall intermediate of its length, an insulated tube rotatably arranged within said tube having one end abutting said rib, an insulating disc abutting the other end of said inner tube and closing the outer end of said tube of insulating material, a flange formed on the end of the outer tube holding said disc in place, and means carried by said inner tube adapted to be rendered accessible through the wall of said outer tube by the rotation of said insulated tube for securing the wire ends therein.

7. An electric wire connecter, comprising a tube of insulating material having an annular rib formed in its inner wall intermediate of its length, a metal tube rotatably arranged in said tube having a flange at one end abutting said rib, an insulating cover encircling said metal tube and abutting the flange thereon, an opening in the wall of said insulating tube, a threaded hole in the wall of the inner composite tube adapted to register with the outer tube opening upon the rotation of said composite tube, a screw threaded in said hole, and an insulating closure closing the end of the outer tube and securing the composite tube therein.

8. An electric wire connecter, comprising a tube of vulcanized fibre having an annular rib swaged in its wall intermediate of its length, a metal tube rotatable in the aforesaid tube and abutting said rib, a vulcanized fibre tube tightly encircling the inner tube, a threaded hole extending transversely through one side of the inner metal and fibre tubes, a screw threaded into said hole, a hole in the outer tube adapted to register with the screw hole said inner tube and covering thereof being adapted to be rotated to move the screw out of register with the hole in the outer tube, and means closing one end of the outer fibre tube and confining the inner tube therein.

WILLIAM P. MARR.